Sept. 26, 1967 W. M. RIKER 3,344,358

PHASE-LOCK SYSTEM RESPONSIVE TO VERY LOW FREQUENCY INPUT SIGNALS

Filed June 12, 1964 4 Sheets-Sheet 1

Inventor:
William M. Riker
By Louis Bernat
Atty.

Inventor:
William M. Riker

Sept. 26, 1967 W. M. RIKER 3,344,358

PHASE-LOCK SYSTEM RESPONSIVE TO VERY LOW FREQUENCY INPUT SIGNALS

Filed June 12, 1964 4 Sheets-Sheet 3

Inventor:
William M. Riker

Sept. 26, 1967 W. M. RIKER 3,344,358

PHASE-LOCK SYSTEM RESPONSIVE TO VERY LOW FREQUENCY INPUT SIGNALS

Filed June 12, 1964 4 Sheets-Sheet 4

Inventor:
William M. Riker

United States Patent Office 3,344,358
Patented Sept. 26, 1967

3,344,358

PHASE-LOCK SYSTEM RESPONSIVE TO VERY LOW FREQUENCY INPUT SIGNALS

William M. Riker, Alamogordo, N. Mex., assignor to Dynalectron Corporation

Filed June 12, 1964, Ser. No. 374,671
15 Claims. (Cl. 329—122)

ABSTRACT OF THE DISCLOSURE

An arrangement for locking the phase and frequency of a voltage-controlled oscillator to a low frequency (down to 0 c.p.s.) input signal. A crystal oscillator, in combination with digital frequency dividers produces three reference signals at relatively high frequencies. Balanced modulators are employed to create sum and difference products between these reference frequency signals, the input signal, and the signal generated by the voltage-controlled oscillator. Selected ones of these products are filtered out, or cancelled by an equal and opposite signal, such that a phase detector, operating on high-frequency signals, produces a phase difference signal appropriate for locking the voltage-controlled oscillator in phase with the input signal.

*Background of the invention*

This invention relates to a phase control system and more particularly to a system wherein the phase of operation of an oscillator can be locked to that of an input signal of very low frequency and which is very sensitive and fast in response while being unaffected by noise and highly reliable in operation, without requiring precision and expensive components.

In phase-lock techniques of the prior art, a voltage controlled oscillator is controlled from the output of a phase detector which compares the phase of an input signal with a signal derived from the oscillator, in a manner to force the oscillator to operate in phase with the input signal. To operate in response to lower frequency input signals, the oscillator may be operated at a higher frequency and a signal from the oscillator may be applied to a modulator along with a reference signal at a fixed frequency, to produce a beat signal which may be compared with the input signal in the phase detector to produce the oscillator control signal. In this case, the oscillator output is not at an integral multiple of the input signal.

Such prior art systems have certain disadvantages. In particular, the phase detector produces components at both sum and difference frequencies, and when the input frequency is very low, the sum component is so close to the difference component that it is practically impossible to use low pass filters or the like to filter out the sum component. As a result of the interference of the sum component, the oscillator control signal is so distorted that phase locking is not possible.

Another disadvantage of the prior art systems is that at lower frequencies, the components and particularly those in the phase detector must be quite large and expensive, and it is also difficult to obtain efficient and reliable operation.

*Summary of the invention*

According to an important feature of this invention, a signal is applied in the output of a phase detector in phase opposition to the sum component of signals applied to inputs thereof, to effect substantial cancellation of the sum component. With this arrangement, the difference component alone may be applied to the voltage controlled oscillator and extremely accurate phase locking is possible. The arrangement is particularly advantageous in that it does not require a low pass filter capable of filtering out the sum component, and it is possible to operate at extremely low frequencies, on the order of one-tenth of a cycle per second or even less, whereas the lowest operating frequency of prior art systems has been on the order of one hundred cycles per second or more.

According to another important feature of the invention, the input signal is converted into a relatively high frequency signal which is applied to a phase detector along with a relatively high frequency signal from the oscillator to develop in the output of the phase detector a difference signal for control of the oscillator. With high frequency signals being applied to the phase detector, it is not necessary to use large capacitors and/or inductors, and it is also possible to obtain very rapid response characteristics.

A further feature of the invention is in the generation of the signal in the output of the phase detector for cancellation of the sum component, according to the first feature described above, through the application of high frequency signals to inputs of the phase detector. In particular, signals are applied at frequencies of $f_x$ plus or minus $f_y$, $f_x$ minus $f_z$ and $f_x$ plus $f_z$, $f_x$ being a fixed relatively high reference frequency, $f_y$ being the relatively low input frequency, and $f_z$ being a relatively low frequency corresponding to the difference between the frequency of operation of the oscillator and a fixed relatively high frequency. With such signals applied in the proper phase relation, the phase detector produces an output signal having a first component at a frequency of $f_z$ minus $f_y$, a second component at a frequency of $f_z$ plus $f_y$, a third component at a frequency $2f_z$, and high frequency components at frequencies on the order of $2f_x$. The high frequency components are readily filtered out by a low pass filter, while the third component at a frequency of $2f_z$ may be applied in phase opposition to the second or sum component, thus leaving only the first or difference component for control of the oscillator. The circuit thus operates to lock in the operation of the oscillator with the input signal, and under such conditions, the effective cancellation of the sum component is possible.

Accordingly, the cancellation of the sum component is effected in a comparatively simple and reliable manner, while at the same time obtaining the advantage of the application of relatively high frequency signals to the phase detector.

Still another feature of the invention relates to the generation of the signals for application to the phase detector, from the input signal, a signal from the oscillator and reference signals generated at predetermined frequencies. Specific features relate to the generation of the signals for application to the phase detector from such reference signals and the input signal and the signal from the oscillator, through the use of modulators and filter circuits.

A still further feature of the invention relates to the use of reference signals at frequencies having a certain integer multiple relationship, such that they can be generated in locked phase relationship from a stable high frequency oscillator, such as a crystal oscillator, through count-down or divider circuits.

This invention contemplates other and more specific objects, features and advantages which will become more fully apparent from the following detailed description taken in conjunction with the accompanying drawings which illustrate a preferred embodiment.

*Description of a preferred embodiment*

Figure 1:
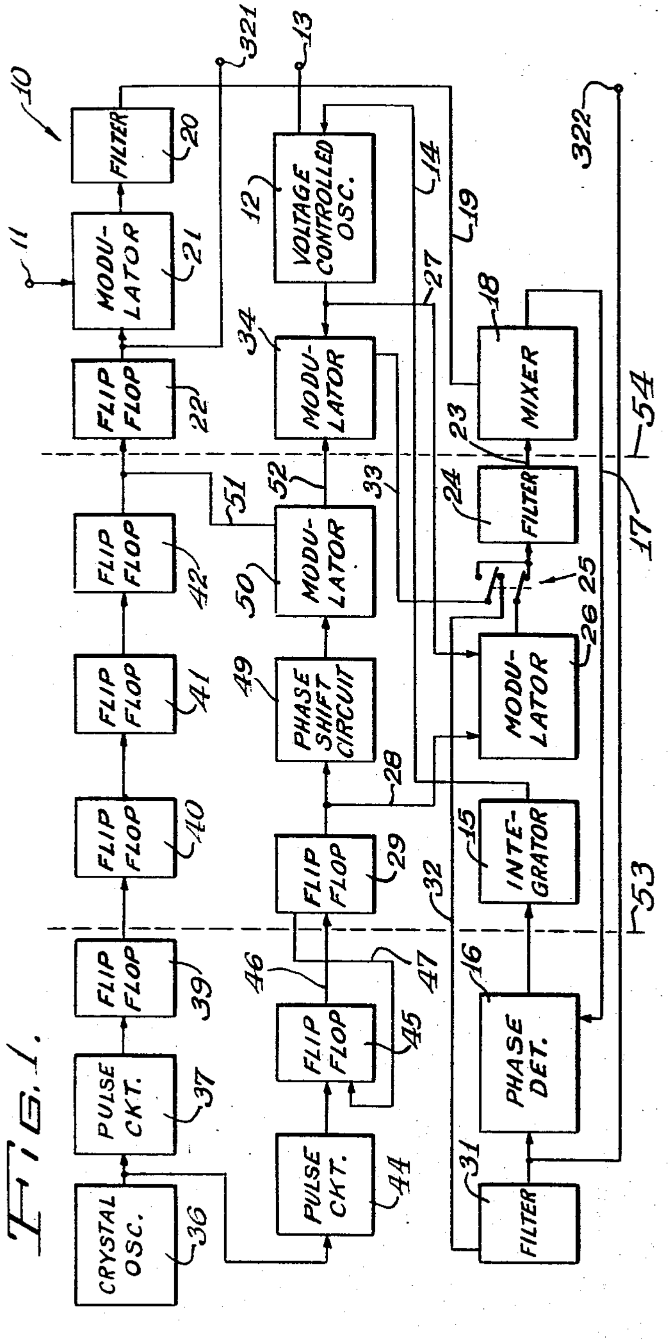
FIGURE 1 is a block diagram of a phase control system constructed according to the principles of this invention.

Reference numeral 10 generally designates a phase control system constructed according to the principles of this invention. In the system 10, a variable frequency input signal is applied to an input terminal 11 and through modulator, filter and detector circuitry operates to control a voltage-controlled oscillator 12 connected to an output terminal 13. By way of example, the input signal may be in a frequency range of from 0 to 2000 cycles per second to cause operation of the oscillator 12 in a frequency range of from 175 kc. down to 173 kc.

Line 14 connects the output of an integrator circuit 15 to the input of the voltage-controlled oscillator 12. A connection is also established between the input of integrator circuit 15 and the output of a phase detector 16. A line 17 is employed to connect the output of a mixer 18 to one input of the phase detector 16. Line 19 connects the output of a filter circuit 20 to one input of the mixer 18. The input of filter circuit 20 is connected to the output of a modulator 21. Input terminal 11 is connected to one input of modulator 21, the second input of which is connected to the output of a flip-flop 22, which supplies a signal at a relatively high frequency as compared to the input signal.

The frequency supplied to the modulator 21 from the flip-flop 22 may be designated as $f_x$, while the frequency of the input signal may be designated as $f_y$. The modulator 21 produces in its output a low frequency signal at $f_y$, a difference signal $f_x$ minus $f_y$, a sum signal $f_x$ plus $f_y$, and also a signal at $2f_x$. The low frequency signal $f_y$ and the high frequency signals are removed by the filter 20, to leave only the difference and sum signals $f_x$ minus $f_y$ and $f_x$ plus $f_y$. The modulator 21, it may be noted is a balanced modulator which does not produce the carrier frequency $f_x$ in its output.

A line 23 is employed to connect the output of a filter 24 to a second input of the mixer 18. A selector switch assembly 25, in the position illustrated in FIGURE 1, connects the output of a modulator 26 to the input of filter 24. The signal from an output of the voltage-controlled oscillator 12 is supplied through a line 27 to one input of the modulator 26. The second input of modulator 26 receives a signal through line 28 from the output of a flip-flop 29.

The modulator 26 responds to signals applied through lines 27 and 28 to develop an output including a component at a frequency equal to the fixed frequency $f_x$ minus a frequency designated as $f_z$ equal to the difference between a predetermined fixed frequency and the output frequency of the voltage-controlled oscillator 12.

The mixer thus supplies signals to the phase detector 16 which include a component at a frequency of $f_x$ minus $f_y$, a component at a frequency of $f_x$ plus $f_y$, and a component at a frequency of $f_x$ minus $f_z$.

With such signals applied to the phase detector 16, it may develop an output signal including a first component at a frequency of $f_z$ minus $f_y$, a second component at a frequency of $f_z$ plus $f_y$, and higher frequency components at frequencies on the order of $2f_x$.

The second component and the higher frequency components may be filtered out by the integrator circuit 15 to supply only the first or difference component at the frequency of $f_z$ minus $f_y$ to the voltage-controlled oscillator 12. The operation of the voltage-controlled oscillator 12 is then phase-locked to the input signal, to maintain $f_z$ at the same frequency and in phase with the input signal $f_y$.

The system as thus far described is highly advantageous in that with high frequency signals being applied to the phase detector, it is not necessary to use large capacitors and/or inductors therein and it is also possible to obtain very rapid response. However, the system thus far described would not operate with extremely low input signals, since it is not possible to filter out the sum component $f_z$ plus $f_y$ with low pass or integrator circuits. A further very important feature of the invention relates to the application of a signal in the output of the phase detector 16 of substantially the same magnitude of opposing phase to the sum component, to effectively cancel the same.

According to this invention, the output of modulator 34 is connected via conductor 33 and the switch 25 (in the illustrated position shown) to the input of a filter 31, the output of which is connected to the second input of the phase detector 16. The modulator 34 is arranged to apply a signal at a frequency equal to the sum of the aforementioned frequencies $f_x$ and $f_z$. Other frequencies developed by the modulator 34 are removed by the filter 31.

With the frequency of $f_x$ plus $f_z$ applied to the phase detector 16, along with the frequencies of $f_x$ minus $f_y$, $f_x$ plus $f_y$, and $f_x$ minus $f_z$, the phase detector 16 develops an output signal having components including a first component at a frequency of $f_z$ minus $f_y$, a second component at a frequency of $f_z$ plus $f_y$, and a third component at a frequency of $2f_z$, as well as higher frequency components at frequencies on the order of $2f_x$. The higher frequency components are removed by the integrator 15, and under proper conditions, the third component at the frequency of $2f_z$ substantially cancels the second component at the frequency of $f_z$ plus $f_y$ in the output of the phase detector, so that only the difference or first component at the frequency of $f_z$ minus $f_y$ is applied to the voltage-controlled oscillator. Thus the operation of the voltage-controlled oscillator is locked to that of the input signal, even at extremely low frequencies. So long as the operation is so locked, the frequency of $f_z$ is maintained equal to the input frequency $f_y$, and substantial cancellation of the sum component of $f_z$ plus $f_y$ by the $2f_z$ component is possible.

Further important features of the invention relate to the application of signals of properly related frequencies to the modulators 21, 26 and 34 in order to obtain the operation as described above. Preferably, and in accordance with this invention, the reference signal applied to the modulator 26 has a frequency equal to the nominal frequency of operation of the oscillator 12 less the frequency applied to modulator 21, while the reference signal applied to the modulator 34 has a frequency equal to the nominal frequency of operation of the oscillator 12 plus the reference frequency applied to the modulator 21. By way of example, with an input signal having a frequency $f_y$ of from 0 to 2000 cycles, and with a reference signal having a frequency $f_x$ of 15 kc. applied to the modulator 21, the nominal frequency of operation of the oscillator 12 may be 175 kc., the reference signal applied to the modulator 26 may be 160 kc. and the reference signal applied to the modulator 34 may be at 190 kc. With this relationship, and with the frequency of the voltage-controlled oscillator 12 being varied from its nominal frequency of 175 kc. down to 173 kc., the $f_x$ minus $f_z$ signal is obtained at the output of filter 24 by selecting the sum components of the output of the modulator 26, while the $f_x$ plus $f_z$ signal is obtained at the output of the filter 31, connected to the output of the modulator 34, by tuning it to the difference components. It will be appreciated that using the same principles, the frequency of operation of the oscillator may be increased above a nominal frequency in proportion to the frequency $f_z$. In that case, the same reference frequencies may be applied but in reverse relation, to produce the $f_x$ minus $f_z$ and $f_x$ plus $f_z$ signals.

An additional feature of the invention is in the provision of an integer number relationship between the frequencies of the reference signals and in the generation of the signals by count-down or frequency divider stages from a single high frequency source, preferably a crystal oscillator 36 in the illustrated embodiment. In accordance with this feature, the frequency of operation of the oscillator 36 may be equal to the frequency $f_x$ multiplied by a whole number $N_1$ and the frequency of the reference signal applied to the modulator 26 may be equal to $N_1f_x$ divided by a second whole number $N_2$, having a value smaller than that of $N_1$, and the frequency of the reference signal applied to the modulator 34 may have a value equal to the frequency $f_x$ multiplied by the sum of $N_1$ plus twice $N_2$, divided by $N_2$. The nominal frequency of operation of the voltage-controlled oscillator may then be equal to the frequency $f_x$ multiplied by the sum of $N_1$ and $N_2$ and divided by $N_2$. By way of example, $N_1$ and $N_2$ may be chosen to be 32 and 3, respectively, and with a frequency $f_x$ of 15 kc., the oscillator 36 is operated at a frequency of 480 kc., with a frequency of 160 kc. being applied ot modulator 26 and a frequency of 190 kc. applied to the modulator 34, the nominal frequency of operation of the oscillator 12 being 175 kc.

To generate the reference signal at the frequency $f_x$ in the illustrated system 10, the output of the oscillator 36 is applied to a pulse circuit 37 which generates pulses at the frequency of operation of the oscillator 36. Such pulses are applied to a divide-by-16 circuit which comprises four flip-flops 39–42 connected in cascade, the output of the final flip-flop 42 of the divide-by-16 circuit being applied to the input of the flip-flop 32 to apply to the modulator 21 a signal at a frequency equal to 1/32 the frequency of the oscillator 36. Thus with the oscillator 36 operated at 480 kc., the frequency applied to the modulator 21 is 15 kc.

To generate the signal which is applied to the modulator 26 on the line 28, the output of the oscillator 36 is applied to another pulse circuit 44, the output of which is applied to a flip-flop 45 having an output connected to the flip-flop 29 through a line 46. A delayed signal is applied back from the flip-flop 29 to the flip-flop 45 through a line 47, and flip-flops 29 and 45 cooperate to define a divide-by-3 circuit producing a frequency on the line 28 equal to 1/3 the frequency of the oscillator 36. Thus with oscillator 36 operated at 480 kc., a frequency of 160 kc. is developed on the line 28.

To generate a reference signal for application to the modulator 36, the output of the flip-flop 29 is applied through a phase shift circuit 49 to a modulator 50, along with a signal applied on line 51 from the output of the flip-flop 42, the output of the modulator 50 being applied on line 52 to the modulator 34. By way of example, a frequency of 160 kc. may be applied to modulator 50 from the phase shift circuit 49, while a frequency of 30 kc. may be applied to the modulator 50 from the flip-flop 42, to thus develop an output signal from the modulator 50 having a component at 190 kc. applied to the modulator 34.

With this comparatively simple and straightforward circuit arrangement, the required reference signals are developed in locked phase relationship in a highly reliable manner.

It should be noted that it is possible to apply the output of modulator 26 through the filter 31 directly to one input of the phase detector 16 and to apply the output of modulator 34 through the filter 24 to the mixer 18, by operating the selector switch 25 to a position opposite the illustrated position. In this case the pass bands of the filters 31 and 24 should be adjusted accordingly, but substantially the same results can be produced, although the ilustrated position of switch 25 is preferred with the higher frequency signal being applied to the phase detector 16 directly.

Figure 2A:
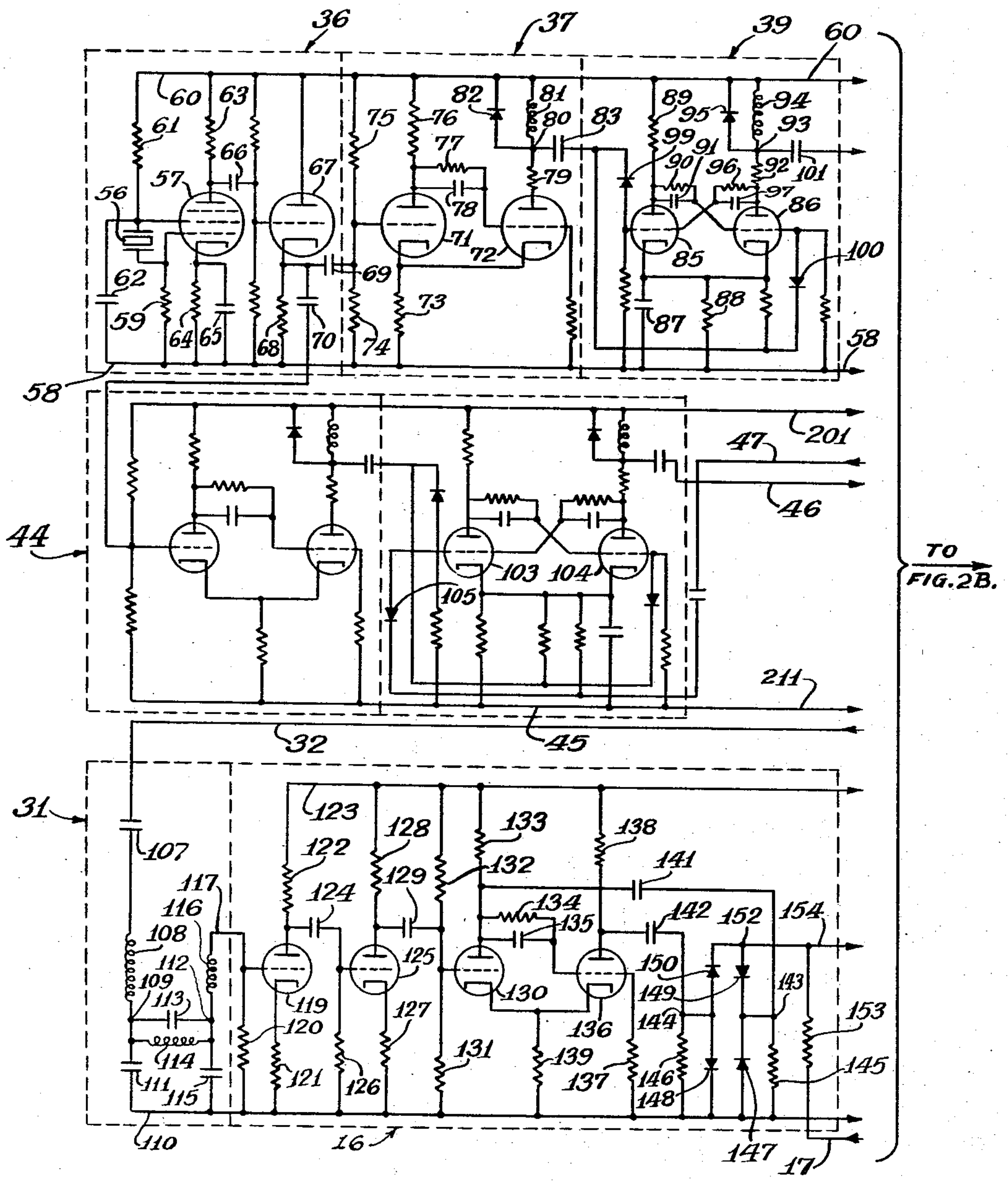
FIGURES 2A, 2B and 2C are together a circuit diagram of the phase control system illustrated in block form in FIGURE 1.
Figure 2B:
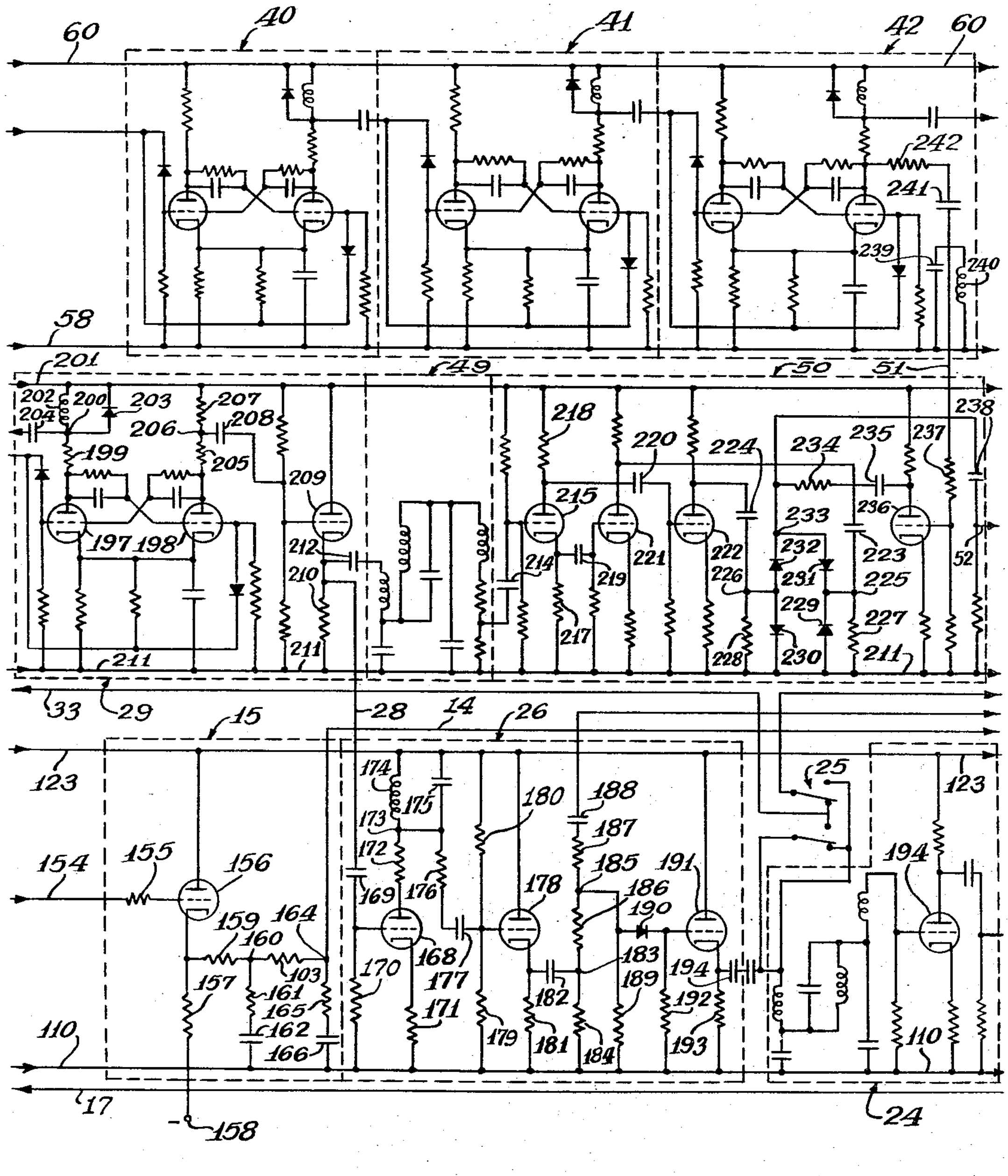
Figure 2C:
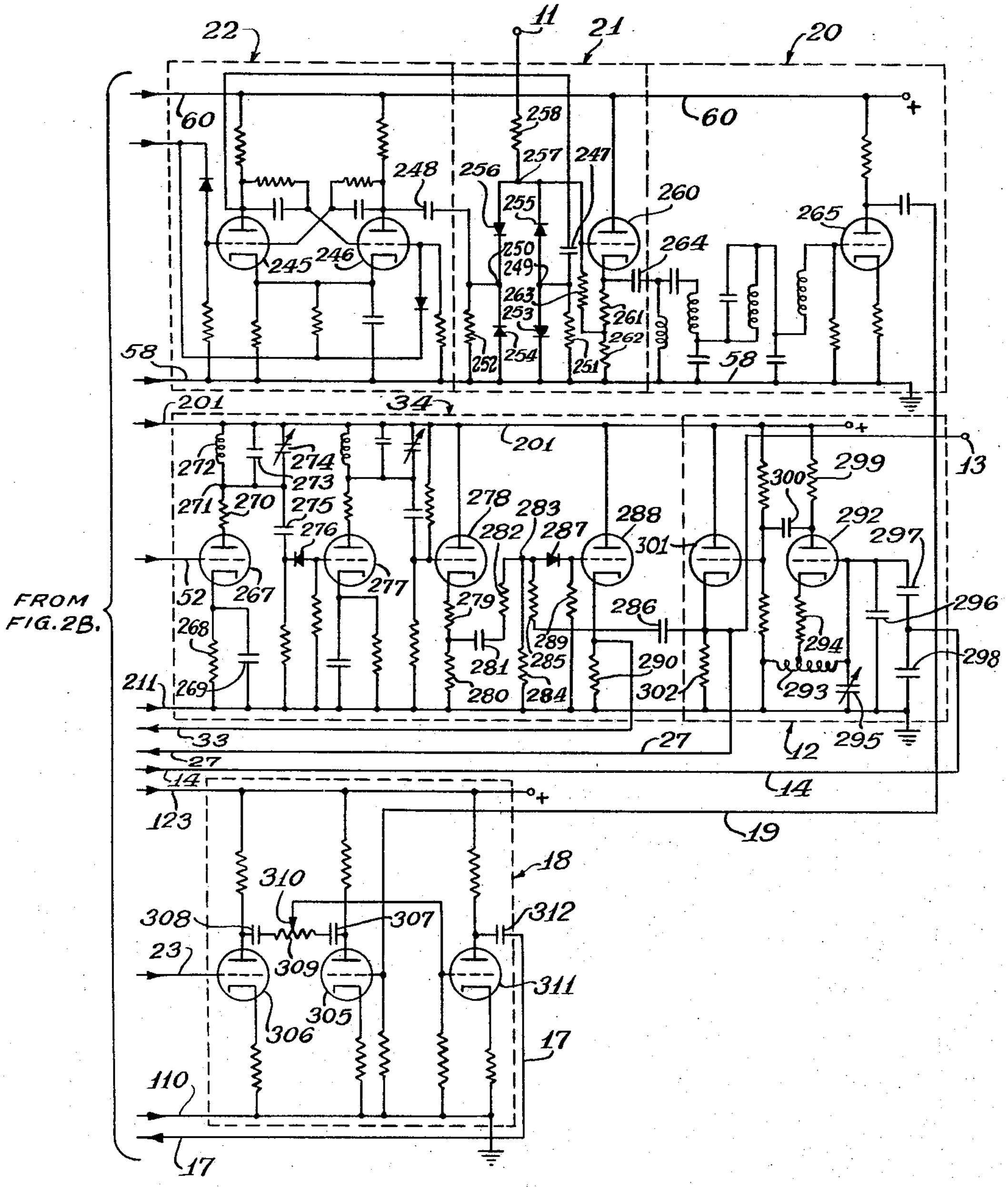

FIGURES 2A, 2B and 2C together form a circuit diagram for the system shown in block form in FIGURE 1, portions to the left of the broken line 53 in FIGURE 1 being shown in FIGURE 2A, portions between broken lines 53 and 54 being shown in FIGURE 2B, and portions to the right of broken line 54 being shown in FIGURE 2C.

Referring to FIGURE 2A, the crystal oscillator 36 comprises a crystal 56 connected between the control grid and the screen grid of a pentode 57 to which operating voltages are applied in conventional fashion, the control grid being connected to a ground line 58 through a resistor 59, the screen grid being connected to a B-plus line 60 through a resistor 61 and also through a by-pass capacitor 62 to the ground line 58, the plate being connected through a resistor 63 to the line 60, and the cathode being connected to the ground line 58 through the parallel combination of a resistor 64 and a capacitor 65.

The plate of the oscillator tube 57 is coupled through a capacitor 66 to the grid of a triode 67 operated as a cathode follower, the cathode being connected to the ground line through a load resistor 68. The cathode of the tube 57 is connected through a capacitor 69 to the input of the pulse circuit 37 and also through a capacitor 70 to the input of the pulse circuit 44.

The pulse circuit 37 comprises a pair of triodes 71 and 72 having cathodes connected together and through a resistor 73 to the ground line 58. The grid of the triode 71 is connected to the ground line through a resistor 74 and to the B-plus line 60 through a resistor 75, a positive bias being thereby applied thereto. The plate of the triode 71 is connected to the B-plus line 60 through a resistor 76 and is also connected to the grid of the triode 72 through the parallel combination of a resistor 77 and a capacitor 78. The plate of the triode 72 is connected through a resistor 79 to a circuit point 80 connected to the B-plus line 60 through a peaking inductor 81 and a diode 82. In the operation of the pulse circuit 37, sharp negative pulses are developed at the circuit point 80 at the frequency of operation of the oscillator 36, and such pulses are applied through a coupling capacitor 83 to the flip-flop circuit 39. The pulse circuit 44 has a construction and operation substantially identical to that of the pulse circuit 37.

The flip-flop 39 comprises a pair of triodes 85 and 86 which are alternately conductive, one being rendered conductive when the other is cut off. As shown, the cathodes of the triodes 85 and 86 are connected together and to the ground line 58 through the parallel combination of a capacitor 87 and a resistor 88. The plate of the triode 85 is connected to the B-plus line through a resistor 89 and is also connected to the grid of the triode 86 through the parallel combination of a resistor 90 and a capacitor 91. The plate of the triode 86 is connected through a resistor 92 to a circuit point 93 connected to the B-plus line 60 through a peaking inductor 94 and a diode 95, the plate of triode 86 being also connected to the grid of the triode 85 through the parallel combination of a resistor 96 and a capacitor 97.

Through the cross-connection of the grids and plates of the triodes, one is rendered conductive when the other is cut off. To shift the conductive states of the triodes, an input pulse of negative polarity is applied to both grids through a pair of diodes 99 and 100 to stop conduction of the triode which is then conductive and to initiate conduction of the other. When the triode 86 is rendered conductive, a negative pulse is developed at the circuit point 93 which is applied through a coupling capacitor 101 to the input of the flip-flop 40.

The flip-flop 45 has a construction and operation substantially the same as that of the flip-flop 39, and comprises a pair of triodes 103 and 104. However, the grid of the left-hand triode 103 is additionally connected through a diode 105 to the line 47 for application thereto of a delayed pulse from the flip-flop 29 in a manner to cause flip-flop 29 and flip-flop 45 to together operate as a divide-by-3 circuit.

As further shown in FIGURE 2A, the filter circuit 31 comprises a capacitor 107 connected in series with an inductor 108 between the line 32 and a circuit point 109 which is connected to a ground line 110 through a capacitor 111. Circuit point 109 is connected to a circuit point 112 through a capacitor 113 and an inductor 114 in parallel, circuit point 112 being connected to the ground line 110 through a capacitor 115 and being connected through an inductor 116 to a line 117 connected to the input of the phase detector circuit 16. The values of the capacitors and inductors in the filter circuit 31 are so chosen as to pass frequencies on the order of $f_x$ plus $f_z$, while rejecting lower and higher frequency components.

The phase detector 16 comprises a first triode amplifier 119 having a grid connected to the line 117 and through a resistor 120 to the ground line 110, a cathode connected through a resistor 121 to the ground line 110, and a plate connected through a resistor 122 to a B-plus line 123. The plate of triode 119 is additionally connected through a coupling capacitor 124 to the grid of a second amplifier triode 125, the grid being connected through a resistor 126 to the ground line 110, the cathode being connected through a resistor 127 to the ground line 110, and the plate being connected through a resistor 128 to the B-plus line 123. The plate of triode 125 is connected through a capacitor 129 to the control grid of a triode 130, the grid being connected through resistors 131 and 132 to the lines 110 and 123. The plate of the triode 130 is connected through a resistor 133 to the line 123 and also through the parallel combination of a resistor 134 and a capacitor 135 to the grid of another triode 136, the grid thereof being connected through a resistor 137 to the ground line 110. The plate of triode 136 is connected through a resistor 138 to the B-plus line 123. The cathodes of the triodes 130 and 136 are connected together and through a resistor 139 to the ground line 110.

In the operation of the circuitry of the phase detector 16 as thus far described, the signal input applied on line 117 from the filter 31 is amplified by the triodes 119, 125 and 130, to produce an amplified signal at the plate of the triode 130. The triode 136 operates as a phase inverter to produce a signal at its plate of opposite phase to that produced at the plate of the triode 130.

The plates of the triodes 130 and 136 are respectively connected through coupling capacitors 141 and 142 to circuit points 143 and 144 which are connected to the ground line 110 through resistors 145 and 146, and which are also connected through diodes 147 and 148 to the line 110 and through diodes 149 and 150 to a circuit point 152. Circuit point 152 is connected through a resistor 153 to the line 17 from the output of the mixer 18.

With this arrangement, a balanced demodulator is provided which develops sum and difference frequency components at the circuit point 152, while suppressing the carrier frequency, in this case the amplified $f_x$ plus $f_z$ signal applied to circuit points 143 and 144.

Circuit point 152 is connected to an output line 154 which is connected to the input of the integrator circuit 15, shown in FIGURE 2B. As shown in FIGURE 2B, line 154 is connected through a resistor 155 to the grid of a triode 156 operated as a cathode-follower, the plate thereof being connected to the B-plus line 123, with the cathode thereof connected through a resistor 157 to a terminal 158 to which a negative supply voltage may be applied, preferably at a minus 50 volts. The cathode of the triode 156 is connected through a resistor 159 to a circuit point 160 which is connected through a resistor 161 in series with a capacitor 162 to the ground line 110 and which is also connected through a resistor 163 to a circuit point 164 connected through a resistor 165 in series with a capacitor 166 to the ground line 110. With this arrangement, a low pass filter and integrating circuit is provided wherein only a slowly varying signal corresponding to $f_z$ minus $f_y$ is produced at the circuit point 164. Circuit point 164 is connected through the line 14 to the voltage-controlled oscillator 12, the circuit of which is shown in FIGURE 2C, described hereinafter.

FIGURE 2B also shows the circuit of the modulator 26 which comprises a first amplifier triode 168 having a grid connected through a capacitor 169 to the line 28 and through a resistor 170 to the ground line 110, a cathode connected through a bias resistor 171 to the ground line 110, and a plate connected through a resistor 172 to a circuit point 173 which is connected to the B-plus line 123 through the parallel combination of an inductor 174 and a capacitor 175. Circuit point 173 is connected through a resistor 176 in series with a capacitor 177 to the control grid of a triode 178 which is connected to the lines 110 and 123 through resistors 179 and 180. Triode 178 is operated as a cathode-follower, the plate thereof being directly connected to the B-plus line 123 and the cathode thereof being connected through a resistor 181 to the ground line 110. The cathode is connected through a coupling capacitor 182 to a circuit point 183 connected to the ground line 110 through a resistor 184 and connected to another circuit point 185 through a resistor 186. Circuit point 185 is connected through a resistor 187 and a capacitor 188 to the line 27 which conveys signals from the output of the voltage-controlled oscillator 12.

With this arrangement, an amplified signal from the output of flip-flop 29 is applied to the circuit point 185, along with a signal from the voltage-controlled oscillator 12. Circuit point 185 is connected through a resistor 189 to the ground line 110 and through a diode 190 to the control grid of a triode 191 which is connected through a resistor 192 to ground. With this arrangement, sum and difference frequency components are applied to the grid of the triode 191, in addition to the frequency components applied at circuit point 185. The triode 191 is operated as a cathode-follower, the plate thereof being connected directly to the line 123 and the cathode thereof being connected through a resistor 193 to ground. The cathode is additionally connected through a capacitor 194 to the switch 25 for connection either to the filter 24 or the filter 31.

The filter 24, as shown in FIGURE 2B, has a configuration substantially the same as that of the filter 31, but includes an amplifier output stage in the form of a triode 194, with conventional connections thereto.

FIGURE 2B additionally shows the circuit of the flip-flop 29 which comprises a pair of triodes 197 and 198 connected in substantially the same manner as the triodes 85 and 86 in the flip-flop 39 described in detail above. One difference is that the plate of the left-hand triode 197 is connected through a resistor 199 to a circuit point 200 connected to a B-plus line 201 through the parallel combination of a peaking inductor 202 and a diode 203. Circuit point 200 is connected through a capacitor 204 to the line 47, to apply a delayed signal to the flip-flop 45, and to cause flip-flops 45 and 29 to together operate as a divide-by-3 circuit. The plate of the right-hand triode 198 is connected through a resistor 205 to a circuit point 206 connected through a resistor 207 to the line 201 and also connected through a capacitor 208 to the grid of a triode 209. The triode 209 is operated as a cathode-follower, the plate being connected directly to the B-plus line 201 and the cathode being connected through a resistor 210 to a ground line 211. The cathode of the triode 209 is connected to the line 28 and is also connected through a capacitor 212 to the input of the phase shift circuit 49.

The phase shift circuit 49 has a configuration substantially identical to that of the filter circuit 31, but the values of the components thereof are so chosen as to obtain proper phase shift characteristics in order to obtain the cancellation of the sum component in the output of the phase detector 16, in the manner as described above. The output of the phase shift circuit 49 is applied to the modulator 50, which has a circuit very similar to that of the phase detector 16. In particular, an input signal from the filter or phase shifter 49 is applied through a capacitor 214 to the grid of a triode 215 which is operated as a phase splitter, having equal cathode and plate resistors 217 and 218. The cathode and plate of the triode 215 are respectively connected through coupling capacitors 219 and 220 to the grids of a pair of triodes 221 and 222, operated as amplifiers, and having plates connected through capacitors 223 and 224 to circuit points 225 and 226 connected to the ground line 211 through resistors 227 and 228 and also through diodes 229 and 230, circuit points 225 and 226 being also connected through diodes 231 and 232 to a circuit point 233. Circuit point 233 is connected through a resistor 234 and a capacitor 235 in series to the plate of an amplifier triode 236 having a control grid connected through a resistor 237 to the line 51.

In operation, signals in 180 degree phase relation are applied to the circuit points 225 and 226, at the frequency applied from the phase shift circuit 49, and a signal at the output frequency of the flip-flop 42 is applied to the circuit point 233 from the triode 236. As a result, sum and difference frequency components are developed at the circuit point 233, from the operation of the diodes 229–232, and such components are applied through a coupling capacitor 238 to the output line 52 which is connected to the modulator 34.

FIGURE 2B further illustrates the flip-flop circuits 40, 41 and 42, each of which is substantially the same as the flip-flop circuit 39. The final flip-flop 42, however, incorporates an additional coupling circuit, wherein the line 51 is connected to the ground line 58 through the parallel combination of a capacitor 239 and an inductor 240, and through a capacitor 241 and a series resistor 242 to the plate of the right-hand triode of the flip-flop circuit. Capacitor 239 and inductor 240 provide a parallel resonant circuit tuned to the output frequency of the flip-flop 42.

Referring to FIGURE 2C, the flip-flop 22 comprises a pair of triodes 245 and 246 connected in a circuit arrangement substantially the same as that of the flip-flop 39, described above in connection with FIGURE 2A. The plates of the triodes 245 and 246 are respectively connected through capacitors 247 and 248 to circuit points 249 and 250 in the modulator 21, circuit points 249 and 250 being connected through resistors 251 and 252 and diodes 253 and 254 to the ground line 58, and through diodes 255 and 256 to a circuit point 257 which is connected through a resistor 258 to the input terminal 11.

For this arrangement, the flip-flop 22 supplies out-of-phase signals at its operating frequency ($f_x$) to the circuit points 249 and 250, while the input signal is applied from terminal 11 through resistor 258 to the circuit point 257. As a result, a signal is developed at the circuit point 257 having sum and difference frequency components. The carrier frequency, i.e. the frequency of operation of the flip-flop 22, is not developed due to the balanced arrangement of the circuit.

The signal developed at circuit point 257 is applied to the control grid of a triode 260 operated as a cathode-follower, the cathode being connected through series resistors 261 and 262 to the ground line 58, with the junction between capacitors 261 and 262 being connected through a resistor 263 to the grid of the triode 260. The cathode is connected through a coupling capacitor 264 to the input of the filter circuit 20 which has a configuration substantially identical to that of the filter circuit 31, described above in connection with FIGURE 2A, but with an amplifier stage including a triode 265.

The modulator 34 comprises a triode 267 having a grid connected to the line 52 from the modulator 50, a cathode connected to ground through a resistor 268 and a capacitor 269 and a plate connected through a resistor 270 to a circuit point 271 which is connected to the B-plus line 201 through the parallel combination of an inductor 272, a fixed capacitor 273 and a variable capacitor 274. Circuit point 271 is connected through a coupling capacitor 275 and a diode 276 to the grid of a triode 277. Triode 277 is connected in a circuit substantially identical to that of the triode 267, with the output thereof being applied to the control grid of a triode 278 operated as a cathode-follower, the plate thereof being connected to the B-plus line 201 and the cathode being connected through series resistors 279 and 280 to the ground line 211. The junction between resistors 279 and 280 is connected through a capacitor 281 and a resistor 282 to a circuit point 283 which is connected through a resistor 284 to the ground line 211 and through a resistor 285 and a capacitor 286 in series to an output of the voltage controlled oscillator 12.

Thus an amplified signal corresponding to the signal applied on line 52 from the modulator 50 and a signal from the oscillator 12 are combined at the circuit point 283. Circuit point 283 is connected through a diode 287 to the control grid of a triode 288, which is connected through a resistor 289 to ground. Triode 288 is operated as a cathode-follower, the plate thereof being connected to the B-plus line 201 and the cathode thereof being connected through a resistor 290 to ground, and also to the line 33.

With this arrangement, an output signal is developed on the line 33 which includes components at sum and difference frequencies, the difference frequency being used and being filtered out by the filter 31 in the illustrated system.

The voltage-controlled oscillator 12 comprises a triode 292 operated as a Hartley oscillator, having a grid connected to ground through an inductor 293, having a tab connected through a resistor 294 to the cathode. The grid is additionally connected to ground through a variable capacitor 295, a fixed capacitor 296, and a pair of capacitors 297 and 298 connected in series. Capacitor 297 is a voltage-responsive capacitor having a value which varies with a control voltage applied to the junction between capacitors 297 and 298 which is connected to the line 14, connected to the output of the integrator circuit 15.

An output signal is derived from the plate circuit of the oscillator 292, the plate thereof being connected through a resistor 299 to the B-plus line 201 and through a coupling capacitor 300 to the grid of a triode 301 operated as a cathode-follower, the cathode being connected through a resistor 302 to ground, and also to the capacitor 286 of the modulator 34 and to the line 27, connected to the oscillator 26. The cathode of triode 301 may additionally be connected to the output terminal 13.

As also shown in FIGURE 2C, the mixer 18 comprises a pair of triodes 305 and 306 having control grids connected to the lines 19 and 23 and having plates connected through coupling capacitors 307 and 308 to the opposite ends of a potentiometer 309 having a movable contact 310 connected to the grid of an amplifier tube 311, the plate of the tube 311 being connected through a coupling capacitor 312 to the line 17.

The circuit arrangements illustrated in FIGURES 2A, 2B and 2C are particularly advantageous in permitting adjustment to balance out undesirable signal components, and particularly to permit cancellation of the $f_z$ plus $f_y$ component by the $2f_z$ component in the output of the phase detector 16, and at the same time to obtain a high degree of stability and reliability. Of particular importance is the use of the balanced diode bridge circuits at key points in the phase detector 16 and the modulators 21 and 50, wherein the carrier signal operates essentially as a switch, and its amplitude does not affect substantially the amplitude of the output signal, to permit a more accurate and stable balancing of signals.

Figure 3:
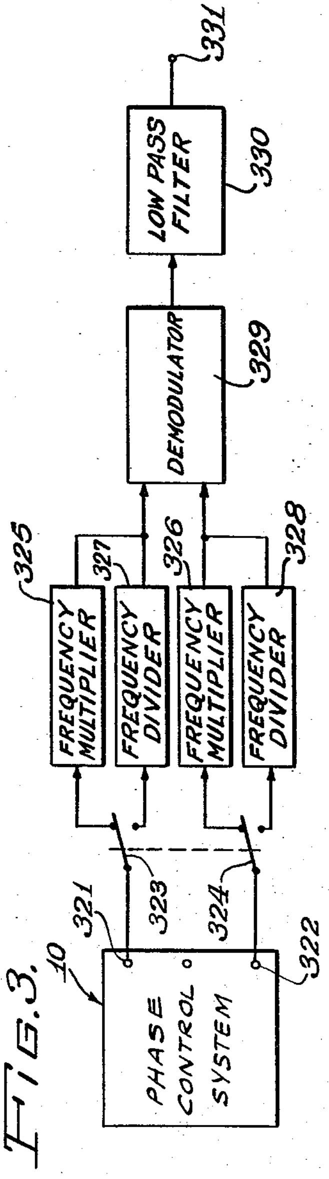
FIGURE 3 is a block diagram illustrating a system wherein frequency multiplication or division operations are performed on outputs from the system of FIGURE 1.

A further advantage of the system of this invention is that frequency multiplication or division operations may be readily performed to produce an output of $Nf_y$ or $f_y/N$. As shown in FIGURE 1, the output of the filter 31, containing a signal at a frequency equal to $f_x$ plus $f_z$, is connected to an output terminal 322 while the output of the flip-flop 22, containing a signal at a frequency equal to $f_x$, is connected to an output terminal 321. As shown in FIGURE 3, such output terminals 321 and 322 are connected through selector switch contacts 323 and 324 either to the inputs of a pair of frequency multipliers 325 and 326 or to the inputs of a pair of frequency dividers 327 and 328. Both multipliers 325 and 326 are preferably arranged to multiply by the same factor and both dividers 327 and 328 are preferably arranged to multiply by the same value. The outputs of the multipliers 325 and 326 and dividers 327 and 328 are applied to a demodulator 329 the output of which is applied through a low pass filter 330 to an output terminal 331.

With the system 10 in a phase lock condition, $f_z$ is equal to $f_y$, so that with the multipliers 325 and 326 being used, there are applied to the input of the demodulator 329 a signal at a frequency of $N(f_x+f_y)$ and a signal at a frequency of $N(f_x)$, the result being a signal having a component at a frequency of $Nf_y$, with higher frequency components which are readily removed by the filter 330. Similarly with the dividers 327 and 328 being used, an output signal of $f_y/N$ may be readily produced. This system operates satisfactorily even with $f_y$ (or $f_z$) being a very low frequency, whereas it would be practically impossible to directly multiply or divide such a low frequency by conventional means.

It will be understood however that various changes and additions may be made without departing from the spirit and scope of the novel concepts of this invention.

I claim as my invention:

1. In a phase control system for responding to an input signal having a relatively low frequency $f_y$, a voltage-controlled oscillator operable at a frequency equal to the difference between a fixed relatively high frequency and a relatively low frequency $f_z$, phase detector means coupled to said voltage-controlled oscillator, means responsive to said input signal and a signal from said voltage-controlled oscillator for applying signals to said phase detector means for developing in the output thereof a first component at a frequency of $f_z$ minus $f_y$ and a second component at a frequency of $f_z$ plus $f_y$, and means for developing and applying a signal in said output of said phase detector means in phase opposition to said second component to effect substantial cancellation thereof.

2. In a phase control system for responding to an input signal having a relatively low frequency $f_y$, a voltage-controlled oscillator operable at a frequency equal to the difference between a fixed relatively high frequency and a relatively low frequency $f_z$, phase detector means coupled to said voltage-controlled oscillator, means responsive to said input signal and a signal from said voltage-controlled oscillator for applying signals to said phase detector means for developing in the output thereof a first component at a frequency of $f_z$ minus $f_y$ and a second component at a frequency of $f_z$ plus $f_y$, and means responsive to said signal from said voltage-controlled oscillator for developing and applying a signal in said output of said phase detector at a frequency of $2f_z$ and in phase opposition to said second component to effect substantial cancellation thereof with the operation of said oscillator being locked to said input signal in response to said first component.

3. In a phase control system for responding to an input signal having a relatively low frequency $f_y$, a voltage-controlled oscillator operable at a frequency equal to the difference between a fixed relatively high frequency and a relatively low frequency $f_z$, reference signal source means for supplying reference signals including a signal at a relatively high frequency $f_x$, modulator means responsive to said input signal and signals from said oscillator and said reference signal source means for developing signals at frequencies of $f_x$ plus or minus $f_y$ and $f_x$ minus $f_z$, phase detector means responsive to said signals from said modulator means for developing an output signal including a component at a frequency of $f_z$ minus $f_y$, and coupling means for applying said component of said output signal to said voltage-controlled oscillator to lock in the operation thereof with said input signal.

4. In a phase control system for responding to an input signal having a relatively low frequency $f_y$, a voltage-controlled oscillator operable at a frequency equal to the difference between a fixed relatively high frequency and a relatively low frequency $f_z$, reference signal source means for supplying reference signals including a signal at a relatively high frequency $f_x$, modulator means responsive to said input signal and signals from said oscillator and said reference signal source means for developing signals at frequencies of $f_x$ plus or minus $f_y$, $f_x$ minus $f_z$ and $f_x$ plus $f_z$, phase detector means responsive to said signals from said modulator means for developing an output signal having components including a first component at a frequency of $f_z$ minus $f_y$, a second component at a frequency of $f_z$ plus $f_y$ and a third component at a frequency of $2f_z$ and in phase opposition to said second component, and means applying said output signal to said voltage-controlled oscillator to lock in the operation thereof with said input signal and to cause said second and third components to subsantially cancel each other in said output signal.

5. In a phase control system for responding to an input signal having a relatively low frequency $f_y$, reference signal source means for supplying reference signals including a first reference signal at a frequency $f_x$ substantially higher than $f_y$, and second and third reference signals at frequencies differing by $2f_x$, a voltage-controlled oscillator for developing a signal at a frequency equal to a frequency inermediate the frequencies of said second and third reference signals plus or minus the frequency $f_z$, modulator means responsive to said input signal, said oscillator signal and said first, second and third reference signals for developing signals at frequencies of $f_x$ plus or minus $f_y$, $f_x$ minus $f_z$ and $f_x$ plus $f_z$, phase detector means responsive to said signals from said modulator means for developing an output signal having components including a first component at a frequency of $f_z$ minus $f_y$, a second component at a frequency of $f_z$ plus $f_y$ and a third component at a frequency of $2f_z$ and in phase opposition to said second component, and means for applying said output signal to said voltage-controlled oscillator to lock in the operation thereof with said input signal and to cause said second and third components to substantially cancel each other in said output signal.

6. In a phase control system for responding to an input signal having a relatively low frequency $f_y$, reference signal source means for supplying reference signals including a first reference signal at a frequency $f_x$ substantially higher than $f_y$, a second reference signal at a higher frequency of $f_xN_1/N_2$ and a third reference signal at a frequency of $f_x(N_1+2N_2)/N_2$, $N_1$ and $N_2$ being whole integer numbers, a voltage-controlled oscillator for developing a signal at a frequency equal to the difference between a frequency of $f_x(N_1+N_2)/N_2$ and a relatively low frequency $f_z$, modulator means responsive to said input signal, said oscillator signal and said first, second and third reference signals for developing signals at frequencies of $f_x$ plus or minus $f_y$, $f_x$ minus $f_z$ and $f_x$ plus $f_z$, phase detector means responsive to said signals from said modulator means for developing an output signal having components including a first component at a frequency of $f_z$ minus $f_y$, a second component at a frequency of $f_z$ plus $f_y$ and a third component at a frequency of $2f_z$ and in phase opposition to said second component, and means for applying said output signal to said voltage-controlled oscillator to lock in the operation thereof with said input signal and to cause said second and third components to substantially cancel each other in said output signal.

7. In a phase control system for responding to an input signal having a relatively low frequency $f_y$, a voltage-controlled oscillator operable at a frequency equal to the difference between a fixed relatively high frequency and a relatively low frequency $f_z$, reference signal source means for supplying reference signals including a signal at a frequency $f_x$ substantially higher than $f_y$, modulator means responsive to said input signal and signals from said oscillator and said reference signal source means for developing signals at frequencies of $f_x$ plus or minus $f_y$ and $f_x$ minus $f_z$ phase detector means responsive to said signals from said modulator means for developing an output signal including a component at a frequency of $f_z$ minus $f_y$ and including high frequency components at frequencies on the order of $2f_x$, coupling means for applying said component of said output signal to said voltage-controlled oscillator to lock in the operation thereof with said input signal, and means in said coupling means for attenuating said high frequency components.

8. In a phase control system for responding to an input signal having a relatively low frequency $f_y$, a voltage-controlled oscillator operable at a frequency equal to the difference between a fixed relatively high frequency and a relatively low frequency $f_z$, reference signal source means for supplying reference signals including a signal at a relatively high frequency $f_x$, modulator means responsive to said input signal and signals from said oscillator and said reference signal source means for developing signals at frequencies of $f_x$ plus or minus $f_y$, and $f_x$ minus $f_z$, phase detector means including a balanced diode bridge switched by high frequency signals from said modulator means for developing an output signal including a component at a frequency of $f_z$ minus $f_y$, and coupling means for applying said component of said output signal to said voltage-controlled oscillator to lock in the operation thereof with said input signal.

9. In a phase control system for responding to an input signal having a relatively low frequency $f_y$, reference signal source means for supplying reference signals including a first reference signal at a frequency $f_x$ substantially higher than $f_y$ and a second reference signal at a frequency substantially higher than $f_x$, a voltage-controlled oscillator for developing a signal at a frequency equal to the difference between a fixed relatively high frequency and a frequency $f_z$, first modulator means including a balanced diode bridge responsive to said input signal and said first reference signal for developing signals at frequencies of $f_x$ plus or minus $f_y$ while suppressing $f_x$, second modulator means responsive to said second reference signal and said signal from said oscillator for developing a signal at a frequency of $f_x$ minus $f_z$, phase detector means responsive to said signals from said modulator means for developing an output signal including a component at a frequency of $f_z$ minus $f_y$, and means for applying said component of said output signal to said voltage-controlled oscillator to lock in the operation thereof with said input signal.

10. In a phase control system for responding to an input signal having a relatively low frequency $f_y$, a voltage-controlled oscillator operable at a frequency equal to the difference between a fixed relatively high frequency and a frequency $f_z$, a fixed frequency oscillator, frequency divider means coupled to said fixed frequency oscillator for developing reference signals including a signal at a frequency $f_x$ substantially higher than $f_y$ and a signal at a frequency substantially higher than $f_x$ and in locked phase relation thereto, modulator means responsive to said input signal, a signal from said oscillator and said reference signals for developing signals at frequencies of $f_x$ plus or minus $f_y$ and $f_x$ minus $f_z$, phase detector means responsive to said signals from said modulator means for developing an output signal including a component at a frequency of $f_z$ minus $f_y$, and means for applying said component of said output signal to said voltage-controlled oscillator.

11. In a phase control system, reference signal source means for supplying reference signals including a first reference signal at a frequency $f_x$ and second and third reference signals at frequencies differing by $2f_x$, a fixed frequency source, frequency divider means coupled to said source for developing said first reference signal and including a final flip-flop stage, frequency divider means coupled to said fixed frequency source for supplying said second reference signal, and modulator means responsive to said second reference signal and a signal applied to the input of said final flip-flop stage for developing said third reference signal.

12. In a phase control system, reference signal source means for supplying reference signals including a first reference signal at a frequency $f_x$, a second reference signal at a frequency substantially higher than $f_x$, and a third reference signal at a frequency equal to the sum of the frequency of said second reference signal and $2f_x$, comprising: a fixed frequency oscillator, a divide-by-16 circuit connected to said fixed frequency oscillator, a divide-by-2 circuit connected to the output of said divide-by-16 circuit for supplying said first reference signal, a divide-by-3 circuit coupled to said fixed frequency oscillator for supplying said second reference signal, and modulator means coupled to the outputs of said divide-by-16 and divide-by-3 circuits for developing said third reference signal.

13. In a phase control system for responding to an input signal having a relatively low frequency $f_y$, a voltage-controlled oscillator operable at a frequency equal to the difference between a fixed relatively high frequency and a relatively low frequency $f_z$, reference signal source means for supplying reference signals including a signal at a relatively high frequency $f_x$, modulator means responsive to said input signal and signals from said oscillator and said reference signal source means for developing signals at frequencies of $f_x$ plus or minus $f_y$ and a pair of signals at frequencies of $f_x$ plus $f_z$ and $f_x$ minus $f_z$, phase detector means responsive to said signals from said modulator means for developing an output signal at a frequency of $f_z$ minus $f_y$ with other signals being effectively cancelled, means for applying said output signal to said voltage-controlled oscillator to lock in the operation thereof with said input signal, a pair of circuits respectively responsive to said reference signal at said frequency $f_x$ and to one of said pair of signals and each arranged to produce an output signal at a frequency equal to the product of a constant and the input frequency thereto, and demodulator means responsive to the output signals from said pair of circuits for producing an output at a frequency equal to the product of said constant and said frequency $f_z$.

14. In a phase control system as defined in claim 13, said pair of circuits being multiplier circuits with said constant being greater than unity.

15. In a phase control system as defined in claim 13, said pair of circuits being divider circuits with said constant being less than unity.

References Cited

UNITED STATES PATENTS

| | | | |
|---|---|---|---|
| 2,881,319 | 4/1959 | Sills | 329—122 X |
| 3,163,823 | 12/1964 | Kellis et al. | 328—155 X |
| 3,195,059 | 7/1965 | Adams | 329—122 |
| 3,209,271 | 9/1965 | Smith | 329—122 |

ROY LAKE, *Primary Examiner.*

A. L. BRODY, *Assistant Examiner.*